Oct. 25, 1938.                F. E. PAYNE                2,134,671
                PLASTIC PACKING WITH BRAIDED ASBESTOS JACKET
                            Filed Dec. 10, 1936
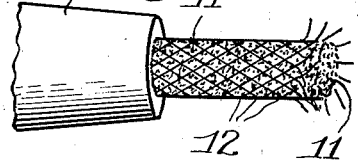
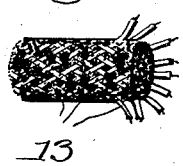
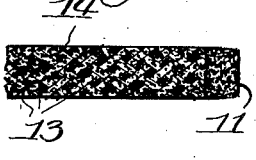
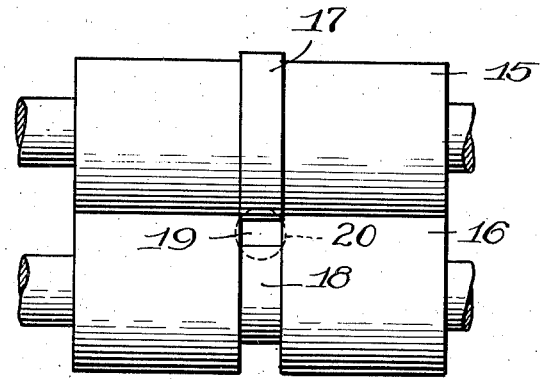
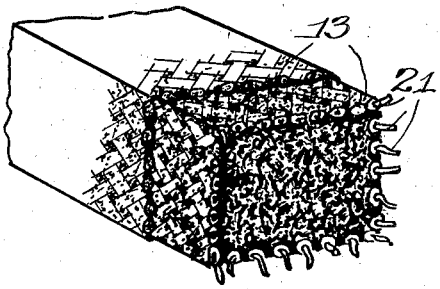
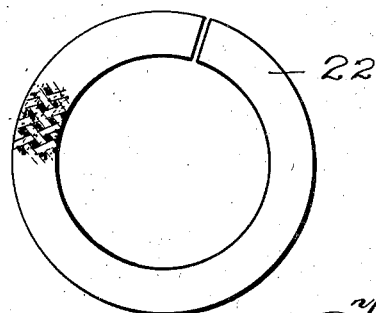
Inventor,
Frank E. Payne,
Dyrenforth, Lee, Chritton & Wiles, Attys.
Witness:

Patented Oct. 25, 1938

2,134,671

UNITED STATES PATENT OFFICE 2,134,671

PLASTIC PACKING WITH BRAIDED ASBESTOS JACKET

Frank E. Payne, Glencoe, Ill., assignor to Crane Packing Company, Chicago, Ill., a corporation of Illinois Application December 10, 1936, Serial No. 115,253

3 Claims. (Cl. 28—1)

My invention relates to improvements in packing of the type in which a plastic core is provided with a braided jacket. The claims of this application are directed to the process of manufacturing the packing. The product is claimed in a divisional application Ser. No. 230,159, filed September 15, 1938.

The general object is to provide a packing which is resilient, tough, has great tensile strength, will not shear off readily, is dry-lubricated thoroughly on its wearing face, and will withstand high temperatures.

In stuffing boxes which have unduly large clearances, there is a tendency for the packings now used to shear off in small particles and work out through the clearance spaces. To prevent this it is necessary to provide end rings at opposite ends of the stuffing box.

The packing of the present invention, when formed in rings to surround the shaft which passes through the stuffing box, does not shear off, requires no end reinforcement, and has many of the advantages of other plastic packings of somewhat similar composition but without the disadvantages thereof.

The new packing comprises a core containing fibrous material, preferably long fiber asbestos, graphite, rubber or Duprene binder, originally in unvulcanized form, braided with asbestos yarn which may be reinforced with wire, squeezed to force some of the plastic composition into and through the jacket, after which the packing is vulcanized, forming a thoroughly bound composition with a tough wearing jacket, permeated with the binder and graphite.

In the drawing:

Fig. 1 is a perspective view of the outlet of the extruding machine;

Fig. 2 is a perspective view of the plastic material with a jacket braided thereon;

Fig. 3 is a perspective view of the packing after it has been pressed to a rectangular cross section;

Fig. 4 is a partial elevation of a pair of rolls;

Fig. 5 is an enlarged perspective view of the product; and

Fig. 6 is an elevation of a completed packing ring.

In Fig. 1 the plastic packing is shown being extruded from the outlet 10 of a suitable press or extruding machine. The core 11 comprises preferably the materials previously mentioned, i. e., fibrous material, graphite and a rubber binder. The plastic compound preferably contains no metal although small particles of non-abrasive metal may be introduced, if desired, as hereinafter explained, and in fact the composition as a whole may be varied as long as the product is plastic or resilient and capable of retaining its resiliency and withstanding high temperatures after vulcanization. The rubber in the mixture as it is extruded, is unvulcanized. The core, upon extrusion, is wound or reinforced with a light thread of fibrous material 12 such as cotton which may be braided thereon. The braided covering aids in holding the core together until it is further reinforced. This additional reinforcement is applied by passing the product thus formed through a braiding machine to braid around it asbestos yarn 13, which, if necessary, may be reinforced with fine, non-abrasive wire, as for example Monel wire.

The unvulcanized core is soft when it is run through the braider and as the braid tightly embraces the core there is a tendency for the latter to squeeze out through the braided material. This squeezing out is definitely assured by passing the product, as thus far formed, between a pair of rolls, which causes the material of the core to extrude or work its way through the interstices of the jacket, thus forming more or less of an outer coating 14 of graphite and binder. In addition the jacket is thoroughly smeared with rubber cement or other binder, and graphite, before the vulcanizing operation, thus thoroughly impregnating the fibers.

The rolls 15, 16, through which the unvulcanized product is passed are shown in Fig. 4. These rolls may comprise one with a rib 17 thereon, the other one having a groove 18 therein, forming a pass 19 through which the product is forced, thus changing it from its round section 20, shown in dotted lines in this figure, to a rectangular or square section corresponding to the pass.

The squeezing operation may be performed by dies or otherwise instead of by the use of rolls. The pressure applied is insufficient to cause bursting of the jacket, which is reinforced by the fine wires 21.

After the squeezing operation the packing is vulcanized, resulting in a resilient, thoroughly bound composition of long fiber asbestos, with a tough wearing jacket impregnated thoroughly with the binder and graphite. The surface of the packing presents an excellent wearing face which is dry-lubricated and the packing as a whole when made into rings, as shown at 22 in Fig. 6, or when otherwise cut up into lengths suitable for installation, does not shear off or wear off in such a way as to require end rings.

On the contrary, the wearing face maintains its integrity during long continued use.

As shown in Fig. 5, several braided jackets may be applied to the unvulcanized core and in fact two such jackets are preferable to one. The first braiding is preferably done upon the dough-like mass of the unvulcanized product while the latter is round in cross section after which the second jacket is braided thereon. The round product is then squeezed by passing it between rolls or dies and is thereafter shaped by a further squeezing operation at which time its cross section may be changed to square or rectangular, before it is vulcanized. In this Fig. 5 which is on a larger scale, the diameter of the yarn is somewhat exaggerated so as to show also the fine metal wire 21 which reinforces the individual strands of the yarn.

In certain types of wet lubricated impregnated packings, not only is the body of the packing lacking in resilience but temperatures of 500° F. to 600° F. will drive out much of the lubricant, leaving the asbestos without oil and graphite, and packings in this condition cause friction and unnecessary wear on the shafts or rods on which they are used. The packing described herein will satisfactorily resist temperatures comparable to those just mentioned, and in fact as high as 1000° F. for valve stem and other service where steam or hot gases are present.

Where the packing is not to be subjected to high temperatures, however, shreds of non-abrasive metal or other small, soft metal particles may be included in the core, such for example as particles of lead or copper.

Packing of the general character described herein is suitable for various classes of service including use on homogenizers, i. e., reciprocating plungers operating against pressures up to 10,000 pounds per square inch.

Where the packing is to be used in conjunction with food products, mica is substituted for graphite.

The asbestos yarn commercially used is said to contain about 10% of cotton, which latter may burn away when the packing is subjected to temperatures such as those described herein. The use of metal wire is therefore very desirable as a reinforcing material and may be made not only of Monel metal but of brass, copper, Swedish iron or other non-abrasive metal. With a double braided jacket of reinforced asbestos a tough outer casing is assured, even after the cotton burns away.

The packing, as stated, has great tensile strength, the lubrication is not dissipated as in certain cases where oil is incorporated, said packing has great resilience at all times due to the plastic core, dry-lubrication is presented at the wearing face, the packing does not harden under the highest steam temperatures or harden while in stock and it does not require end rings in case annular clearances are large.

I claim:

1. The process of manufacturing packing comprising, extruding a plastic mixture of graphite, asbestos fiber and unvulcanized rubber, braiding a light retaining jacket over the extruded core to maintain its shape during subsequent operations, thereafter braiding a heavier jacket of asbestos fibers over said core, shaping the product thus formed to obtain the desired cross section and to squeeze some of the core through the interstices of the jacket and thereafter vulcanizing the product thus produced, whereby said jacket is vulcanized to said core and a resilient product is provided.

2. The process of manufacturing packing comprising, extruding a length of plastic material having asbestos fibers, graphite and unvulcanized rubber therein, surrounding the material thus extruded in a light covering to facilitate feeding the same to a braiding machine, braiding a jacket of reinforced asbestos yarn over the product thus formed, compressing said product to force some of the core material through the interstices of the jacket, applying additional graphite and a binder to the exterior of the product and thereafter vulcanizing the same whereby a compressible, resilient product is formed, which is dry-lubricated and tough on its wearing face and capable of withstanding high temperatures.

3. The process of manufacturing packing in continuous lengths comprising, extruding a plastic mixture containing asbestos fibers, graphite and a binder in a continuous length, braiding a light, fibrous jacket around the same, thereafter braiding a heavier jacket around the same, of asbestos yarn reinforced with fine metal wire, passing the length of material thus formed between rollers to press and shape the same, and thereafter subjecting the product to a heat treatment to make it more heat resistant without hardening the same, and whereby said product has a tough lubricated wearing face which retains the body of the packing during long continued use and gradual wearing away of said face.

FRANK E. PAYNE.